July 6, 1926.
M. LACHMAN
1,591,328
GRILLE OR GRATING
Filed March 3, 1925
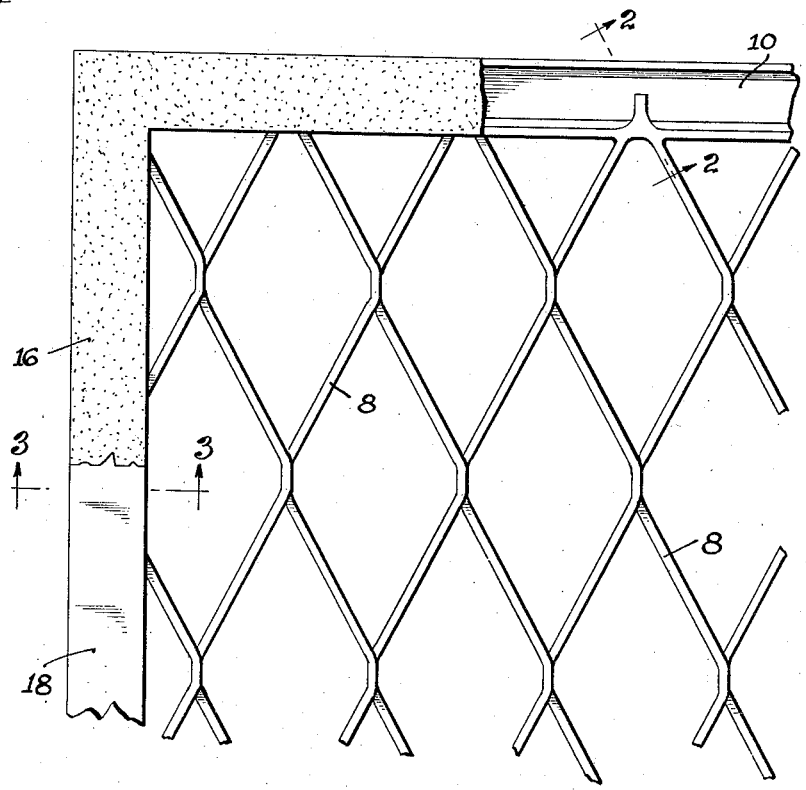
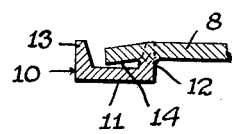
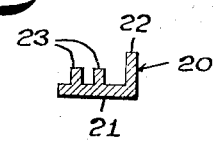
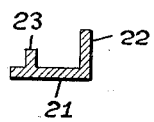
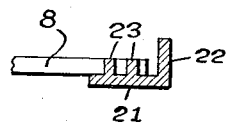
INVENTOR
*Maurice Lachman.*
BY
*Townsend + Decker*
ATTORNEYS Patented July 6, 1926.

1,591,328

UNITED STATES PATENT OFFICE.

MAURICE LACHMAN, OF NEW YORK, N. Y., ASSIGNOR OF ONE-THIRD TO JOHN R. TENCH AND ONE-THIRD TO ALEXANDER LACKEY, BOTH OF NEW YORK, N. Y.

GRILLE OR GRATING.

Application filed March 3, 1925. Serial No. 12,851.

This invention relates to the production of metallic grilles or gratings for use as protecting screens for machinery, areaways and the like.

It is a primary object of the invention to provide a permanent reinforcement for a metal grating and to so apply the reinforcing strips that the whole body of the screen will be strengthened and there will be no likelihood of the body of the screen becoming separated from the reinforcing frame so formed.

It is a further object of the invention to so form the metal grating that it will have no projecting parts and that it will have a neat outward appearance.

Other and more specific objects will appear as the description proceeds.

In the drawings:—

Fig. 1 illustrates one complete embodiment of my invention wherein I have shown a section of a metallic grating.

Fig. 2 is a section thereof taken substantially on the line 2—2 of Fig. 1.

Fig. 3 is a similar section on the line 3—3 of Fig. 1.

Fig. 4 shows an alternate form of reinforcing strip which may be used.

Fig. 5 shows a second modification thereof.

Fig. 6 is a section through the edge of the metal grating wherein the form of reinforcing strip shown in Fig. 4 is used.

The body of the grating according to my invention is preferably composed of the screen part 8 which is formed from a plate of sheet steel properly slitted and expanded to the shape of grating desired. This form of screen forms no part of my present invention. The thickness of the sheet of steel, the length and spacing of the slits therein and the distance to which it is expanded depends upon the use for which the final product is intended.

In order to properly reinforce and protect the edges of the body part of the screen so that there will be no projecting parts to work loose, I have shown, according to the first form of my invention, a channeled strip 10 having the body part 11 lying in a plane parallel with the body of the screen 8, the flanges 12 and 13 projecting in the same general direction from the body part 11 of the strip. In securing the channeled strip to the metal screen the strip is so placed, with respect to the screen that the edge or extended ends of the screen proper lie in a position between the flanges 12 and 13. The screen is then permanently welded to the flanges 12, preferably by the resistance method of electric welding, in which the contacting portions of the screen and the flange are heated and pressure is applied thereto so that the parts are permanently fused or merged. The result is that the body of the screen is sunk so as to lie within the plane of the reinforcing strips 10. Since every strand of the screen is thereby rendered into a substantially integral part with the reinforcing strips, there is no likelihood of these parts ever becoming separated from vibrations, pressure or other causes. The extended ends of the screen within the channel are preferably sunk slightly as indicated at 14, so as to further avoid any undesirable projecting points of the material of the screen. In order to more firmly secure the screen and reinforcing strips I may fill the channel of the strip 10 with a hard cement 16, as shown in the drawings.

I have shown the additional metal strip 18 as extended across the flanges 12 and 13 and permanently secured thereto as by the welding method referred to above or otherwise, in order to further reinforce the grating and to insure that the grating and reinforcing strips will be permanently secured together. The strip 18 gives a more finished appearance to the grating and may be used particularly where both sides of the grating will be exposed.

In Figs. 4 and 6 I have shown the reinforcing strip 20 formed as an angle with the body part 21 and the extended flange 22. Mounted on the inner or flanged side of the body part 21 are securing ribs or flanges 23 which preferably project from the body part 21 a distance substantially the same as the thickness of the sheet metal forming the body part of the grating. The projecting or outer ends of the screen 8 are, according to this form of the invention, permanently welded to the ribs 23, also preferably by the same welding process, so that the ends of the screen will lie against the inner or flanged face of the body 21 of the strip. This forms a particularly strong joint between the parts in view of the continuous contact surface between the ends of the screen 8 and body part 21. If desired, one of the flanges 23 may be omitted as shown for example in Fig. 5. The form shown in Fig. 5 may be used particularly where a light grating is to be formed and one not subject to hard usage.

A grating formed as herein disclosed is found to posses great strength and does not become weakened through use or vibration, but it will stand the most severe strains without the tendency to become loosened. This result follows because of the substantially integral relation between the reinforcing strips and the body part proper of the screen.

While I have shown my invention as particularly applicable to an expanded metal grating it is apparent that the invention is not so limited but that other forms of integral grating may be reinforced and supported as herein disclosed. The particular forms of reinforcing strips or edgings which I have herein disclosed may obviously be varied to suit the purpose for which the finished product is intended without departing from the spirit of my invention. I desire it to be understood that the particular forms of the invention herein disclosed are to be considered merely as illustrative and that I am limited only as set forth in the appended claims.

I claim as my invention:

1. A metal grille or grating embodying a reinforcing frame and a one piece screen portion, said reinforcing frame being provided with a projecting flange, portions of said screen being welded to said flange and merged into the same so that the exposed surface of said edge lies substantially flush with the outer or free edge of said flange.

2. A metal grille or grating comprising an integral screen portion and a reinforcing frame, said frame including a body part lying substantially parallel to the plane of said screen, and flanges extending outwardly from said body part, said screen being permanently welded to one of said flanges and compressed into the extended edge thereof.

3. A metal grille or grating formed with a screen portion and a frame, said frame being substantially channel-shaped with the channel therein opening at right angles to the plane of the screen, the edges of said screen being extended across one of the flanges forming said channel, the extended edges of said screen being merged into and welded to the free edge of said flange.

4. A metal grille or grating comprising a screen portion formed of expanded metal and a reinforcing frame, said frame including a body part lying substantially parallel to the plane of said screen, and a flange extending outwardly from said body part, said screen being permanently welded to said flange and compressed into the extended edge thereof.

5. A metal grille or grating comprising a screen portion and a reinforcing frame, said frame including a body part lying substantially parallel to the plane of said screen, and flanges extending outwardly from said body part, said screen being permanently welded to one of said flanges, the space between said flanges containing cement to cover and secure the projecting ends of said screen portion to said body part.

6. A metal grille or grating formed with a screen portion and a frame, said frame being substantially channel-shaped with the channel therein opening at right angles to the plane of the screen, said screen being permanently welded to one of the flanges forming said channel, said channel being filled with cement.

7. A metal grille or grating formed with a screen portion and a frame, said frame being substantially channel-shaped with the channel therein opening at right angles to the plane of the screen, said screen being permanently welded to and merged into one of the flanges forming said channel so that the outer surface of said screen and flange lie substantially flush and a plate projected across the flanges of said channel and secured to both said flanges and said screen.

Signed at New York in the county of New York and state of New York this 2nd day of March A. D. 1925.

MAURICE LACHMAN.